United States Patent [19]

Okada et al.

[11] Patent Number: 4,672,468
[45] Date of Patent: Jun. 9, 1987

[54] MAGNETIC RECORDING APPARATUS WITH RECORDING OF FIRST AND SECOND SOUND SIGNALS

[75] Inventors: Yoshinori Okada, Katsuta, Japan; Hisaji Watanabe, Schaumburg, Ill.; Isao Fukushima; Hideo Yoshida, both of Katsuta, Japan

[73] Assignees: Hitachi Micorcomputer Engineering Co., Ltd.; Hitachi, Ltd., both of Tokyo, Japan

[21] Appl. No.: 751,588

[22] Filed: Jul. 3, 1985

[30] Foreign Application Priority Data

Jul. 4, 1984 [JP] Japan .................. 59-137163

[51] Int. Cl.$^4$ ............................ H04N 5/78
[52] U.S. Cl. .................. 358/310; 358/328; 358/343; 360/19.1
[58] Field of Search ......... 360/19.1, 20; 358/341, 358/343, 310, 328, 330

[56] References Cited

U.S. PATENT DOCUMENTS 4,580,174  4/1986  Tokunaka ............... 360/19.1 X

Primary Examiner—Robert L. Richardson
Attorney, Agent, or Firm—Antonelli, Terry & Wands

[57] ABSTRACT

A VTR is furnished with a phase-locked loop whose reference input is a color signal subcarrier. The phase-locked loop fixes two sound FM carrier frequencies in constant relationships with the frequency of the color signal subcarrier, thereby to stabilize the carrier frequencies. The two sound FM carrier frequencies are respectively selected to be integral times of $f_H/2$ (where $f_H$ denotes the frequency of a horizontal synchronizing signal). The frequencies of the beats between both the sound carrier are fixed to integral times of $f_H/2$, with the result that the degradation of a reproduced picture attributed to the beats is prevented.

4 Claims, 13 Drawing Figures

MAGNETIC RECORDING APPARATUS WITH RECORDING OF FIRST AND SECOND SOUND SIGNALS

BACKGROUND OF THE INVENTION

The present invention relates to a magnetic recording and reproducing apparatus (hereinbelow, termed "VTR") which records a video signal and a sound signal and reproduces them by the use of a magnetic tape.

In a prior-art VTR, in recording a video signal and a sound signal on a magnetic tape, the received video signal and sound signal are respectively subjected to signal processing, whereupon the processed signals are recorded on different places (tracks) of the magnetic tape through respective exclusive heads. FIG. 8 shows a block diagram of the prior-art magnetic recording and reproducing apparatus, while FIG. 9 shows a recorded pattern on the magnetic tape in the prior art. They will now be explained. Referring to FIG. 8, input sound signals 1 and 1' have a bias signal of several tens kHz superposed thereon in a sound signal processing circuit 2 and are recorded on the magnetic tape through sound heads 3 and 4. Here, the sound signal inputs 1 and 1' and the sound heads 3 and 4 are respectively supplied with an R signal and an L signal for stereo sounds or with signals corresponding to a sound-main signal and a sound sub-signal, whereby stereophony or sound multiplex broadcast is coped with.

On the other hand, in the mode of reproduction, signals detected by the sound heads 3 and 4 are subjected to signal processing in the sound processing circuit 2, and reproduced sound signals 5 and 5' respectively corresponding to the input sound signals 1 and 1' are obtained.

A received video signal 6 is subjected to signal processing by a video signal processing circuit 7, and the processed signal is supplied through a rotary transformer 8 to video heads 9 and 10 which are mounted on a rotating cylinder. The video heads 9 and 10 are installed symmertically to each other with respect to the axis of rotation and with a certain inclination to the traveling direction of the magnetic tape. They move on the magnetic tape while being alternately switched, to magnetically record or reproduce the video signal. Thus, a reproduced video signal 15 is obtained.

Owing to the operations stated above, as shown in FIG. 9, the respective sound signals are recorded on recording tracks 11 and 12 by the sound heads 3 and 4, and the video signal is recorded on recording tracks 13, 13', 13" . . . and recording tracks 14, 14', 14" . . . by the video heads 9 and 10 respectively.

In recent years, the magnetic recording and reproducing characteristics of video signals have been enhanced with improvements in magnetic heads and magnetic tapes. Therefore, the quantity of a tape required for attaining a desired signal-to-noise ratio has been decreased. Accordingly, the tape speed has been lowered to enhance the recording density. In this case, however, the technique of the exclusive track recording system as described above has led to the disadvantage that regarding the sound signals, the sound heads are fixed, so the bands of the reproduced sound outputs narrow in correspondence with the lowered component of the tape speed, and the signal-to-noise ratio degrades.

Further, difficulties have been involved as to wow and flutter characteristics due to the instability of a tape running system.

In order to relieve or eliminate the disadvantages of the above technique, the following techniques of a recording system which uses a video track for a double purpose have been proposed. The first method consists in utilizing a method disclosed in the Official Gazette of Japanese Patent Application Publication No. 39-9565. The method described in this official gazette is such that a video carrier subjected to frequency modulation with a video signal and a sound carrier subjected to frequency modulation with a sound signal are both recorded on a recording track for the video signal. The official gazette contains quite no description on a case where the video signal is a color signal. However, when the disclosed method is utilized, the recording of the color video signal is carried out as follows.

First, the sound carrier subjected to frequency modulation with the sound signal is recorded on the recording track for the video signal. Subsequently, a luminance signal carrier subjected to frequency modulation with a luminance signal and also a down-converted chrominance signal are superposedly recorded on the same track as the track on which the sound carrier has been recorded. The sound signal is first recorded, and the video signal is subsequently superposed thereon. The signal subjected to frequency modulation with the sound signal is recorded down to the depths of the magnetic layer of the magnetic tape, whereupon the signal subjected to frequency modulation with the luminance signal, which is higher in frequency than the signal subjected to frequency modulation with the sound signal, is recorded on the surface of the magnetic layer without being erased.

As the second method, the signal modulated with the sound signal is provided between the band of the down-converted chrominance signal and the band of the signal modulated with the luminance signal, and these three signals are multiplexed frequency-wise, whereby the sound signal is recorded on the recording track for the video signal.

Thus, the relative speed between the tape and the head is sharply raised, and the signal-to-noise ratio of the reproduced sound quality can be enhanced.

The recording system using the video track for the double purpose, however, has had the disadvantage that when two FM sound carrier frequencies are set in correspondence with the stereophonic R signal and L signal or with the sound main-signal and sub-signal, a beat attributed to both the carrier frequencies develops and appears in the band of the down-converted chrominance signal, so it leaks to the down-converted chrominance signal through the tape of the same recording track or the rotary transformer 8 to degrade the reproduced color picture quality. More specifically, as illustrated in FIG. 10, regarding the down-converted chrominance signal 15, the signal 16 frequency-modulated with the luminance signal, and the FM sound carriers 17 and 18, the beats 19 and 20 appear in the band of the down-converted chrominance signal in the reproducing mode, to hamper the reproduced color signal. Especially in the absence of the sound signal, the beats arise fixedly on a screen, and the degradation is conspicuous.

Here, the latter method of the frequency-wise multiplexing is comparatively less susceptible to the nonlinearity of the tape/head system because the signal modulated with the luminance signal has a bias effect on the signal modulated with the sound signal. In contrast, in the former method of the superposed recording on the track, there is no bias signal for the signal modulated with the sound signal, the influence of the nonlinearity is great, and the beats of particularly odd-numbered orders ascribable to the nonlinearity are great.

SUMMARY OF THE INVENTION

An object of the present invention is to eliminate the disadvantages of the prior arts described above and to provide a VTR in which, even in raising the recording density, a good reproduced sound quality is attained without degradation in the picture quality.

In order to accomplish the object, according to the present invention, a VTR is furnished with a phase-locked loop whose reference input is a color signal subcarrier. The phase-locked loop fixes two sound FM carrier frequencies in constant relationships with the frequency of the color signal subcarrier, thereby to stabilize the carrier frequencies. The two sound FM carrier frequencies are respectively selected to be integral times of $f_H/2$ (where $f_H$ denotes the frequency of a horizontal synchronizing signal).

DETAILED DESCRIPTION OF THE PREFERRED EMBODIMENTS

Figure 1:
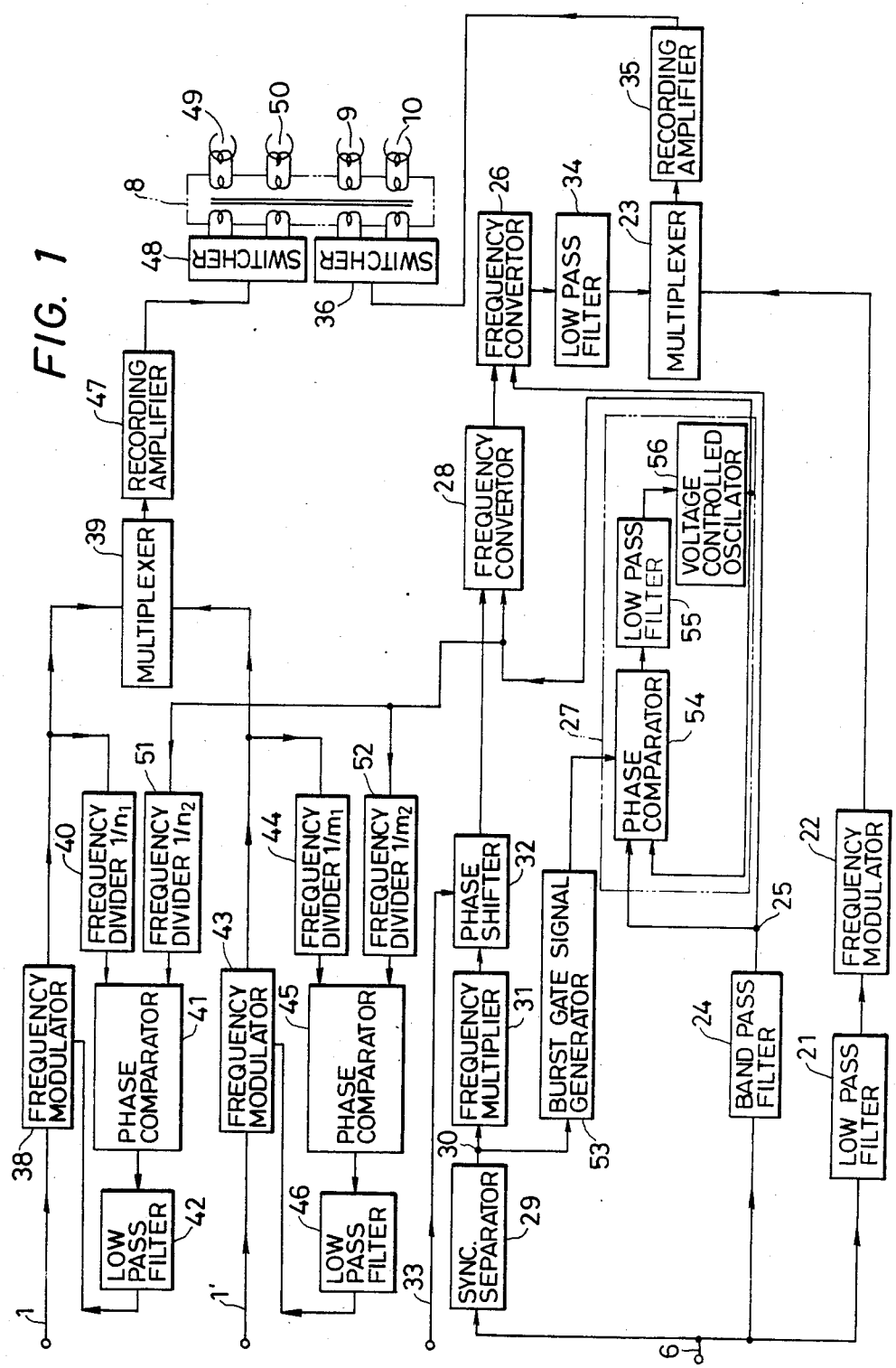
FIG. 1 is a block diagram showing an embodiment of the magnetic recording and reproducing apparatus of the present invention.
Figure 8A:
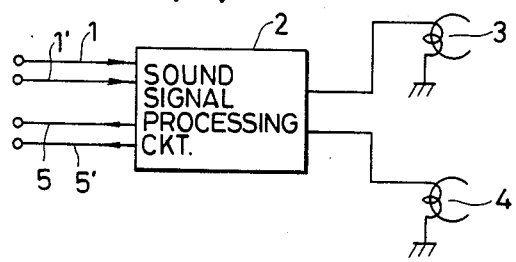
FIGS. 8(A) and 8(B) are block diagrams of a prior-art VTR.
Figure 8B:
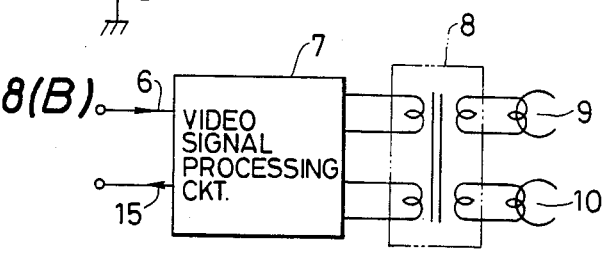
Figure 9:
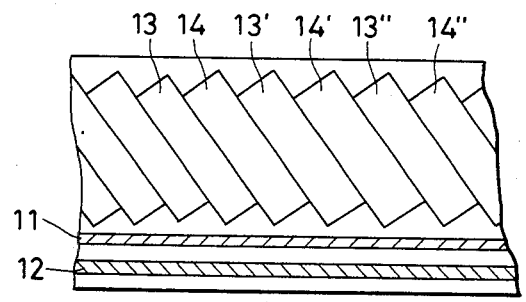
FIG. 9 is a diagram of a recording pattern on a magnetic tape in the prior-art VTR.
Figure 10:
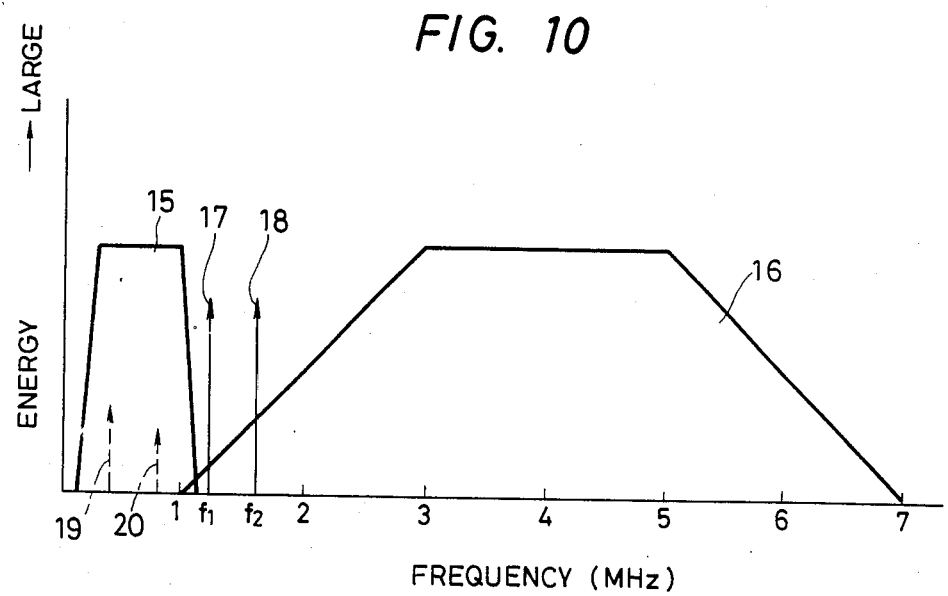
FIG. 10 is a frequency spectrum diagram of a VTR recording signal in the prior art.

Now, an embodiment of the present invention will be described with reference to FIG. 1. FIG. 1 is a block diagram of a VTR in the present invention, in which portions equivalent or identical to those in FIG. 8 are assigned the same symbols.

Hereunder, the case of a VTR conforming to the NTSC signal VHS system will be cited and explained. Referring to FIG. 1, an input video signal 6 to be recorded is turned into only a luminance signal through a low-pass filter 21 for removing a chrominance signal, and the luminance signal is applied to a frequency modulation circuit 22 for the luminance signal, so that a signal subjected to frequency modulation according to the luminance signal is applied to a multiplexer 23. On the other hand, the input video signal 6 is turned into only the chrominance signal 25 through a band-pass filter 24 for passing the chrominance signal, and this chrominance signal is applied to a first frequency converter 26. The chrominance signal 25 is also applied to an automatic phase control circuit (hereinbelow, abbreviated to "APC circuit") 27, from which a continuous wave signal ($f_{SC}$) agreeing in frequency and phase with the color subcarrier of the chrominance signal is supplied to a second frequency converter 28. Meanwhile, the input video signal 6 is applied to a sync signal separator 29, in which synchronizing signals are separated, and the horizontal synchronizing signal 30 perfectly put into a horizontal synchronizing frequency even in a vertical blanking period is produced. This signal shall hereinafter be called the "$f_H$ signal". The $f_H$ signal 30 is supplied to a frequency multiplier 31 at the succeeding stage. The frequency multiplier 31 generates a signal at a frequency which is 40 times higher than that of the $f_H$ signal 30. The generated signal shall hereinafter be called the "40 $f_H$ signal". The 40 $f_H$ signal is supplied to an advanced phase shifter 32.

The phase shifter 32 is supplied with the 40 $f_H$ signal and a head control signal 33 which indicates a head to operate between video heads 9 and 10, and it rotates the phase of the supplied 40 $f_H$ signal by 90 degrees at each time of one horizontal scanning or the so-called 1 H. Herein, the directions of the phase rotations in the cases of the rotary heads 9 and 10 are rendered opposite to each other by the head control signal 33. The phase shifted 40 $f_H$ signal (PS 40 $f_H$) whose phase has been rotated in this manner is applied from the aforementioned circuit 32 to the second frequency converter 28, from which a local oscillation signal ($f_{SC}$+PS 40 $f_H$) being the frequency sum between the phase shifted 40 $f_H$ signal and the continuous wave signal ($f_{SC}$) is supplied to the first frequency converter 26. In the first frequency converter 26, the input chrominance signal 25 is down-converted (to the frequency of 40 $f_H$) using the local oscillation signal ($f_{SC}$+PS 40 $f_H$), whereupon the down-converted chrominance signal 15 obtained is supplied to the multiplexer 23 through a low-pass filter 34. Accordingly, the down-converted chrominance signal 15 becomes a signal whose phase is rotated by 90 degrees each time of 1 H.

A burst gate signal generator 53 detects a burst period from the applied $f_H$ signal 30, and applies a burst gate signal to a phase comparator 54. The APC circuit 27 is composed of the phase comparator 54, a low-pass filter 55, and a voltage controlled oscillator 56 whose oscillation frequency is determined by a crystal oscillator. It builds up the phase-locked loop in the burst period, and it produces the continuous wave signal ($f_{SC}$) equal in frequency to the color subcarrier of the input video signal and synchronized therewith.

In the mode of reproduction, the phases of reproduced chrominance signals are made uniform by a retarded phase shifter, and the retarded phase shifted chrominance signal and a reproduced chrominance signal delayed by 1 H are combined, whereupon detection is performed. Then, the main chrominance signal has its output doubled to enhance the signal-to-noise ratio. In addition, the crosstalk of the down-converted chrominance signal from an adjacent track is canceled because the phase is reversed at each time of 1 H.

Next, both the inputs are multiplexed in the multiplexer 23, the output of which is supplied to the rotary video head 9 or 10 through a recording amplifier 35, a switcher 36 and a rotary transformer 8 and is recorded on a tape.

With the operation as stated above, in case of advancing the phase by 90 degrees every H, for example, in case of the recording by the video head 9, the spectrum of the down-converted chrominance signal 15 exhibits an energy distribution at intervals of $f_H$ with the center located at a frequency which is $\frac{1}{4} f_H$ higher than $40 f_H$ (this frequency shall hereinafter be denoted by $f_S$), as illustrated at (a) in FIG. 2 [with energy 37 removed]. In contrast, in case of retarding the phase by 90 degrees every H, namely, in case of the recording by the video head 10, the spectrum of the down-converted chrominance signal 15 exhibits an energy distribution at intervals of $f_H$ with the center located at a frequency which is $\frac{1}{4} f_H$ lower than $f_S$, as illustrated at (b) in FIG. 2 [with the energy 37 removed]. Accordingly, the spectrum of the down-converted chrominance signals 15 becomes as shown in (c) of FIG. 2 with (a) and (b) of FIG. 2 combined, and it has the minimum energy at $f_S$, energy being distributed at intervals of $f_H/2$ with the center at $f_S$.

Figure 2:
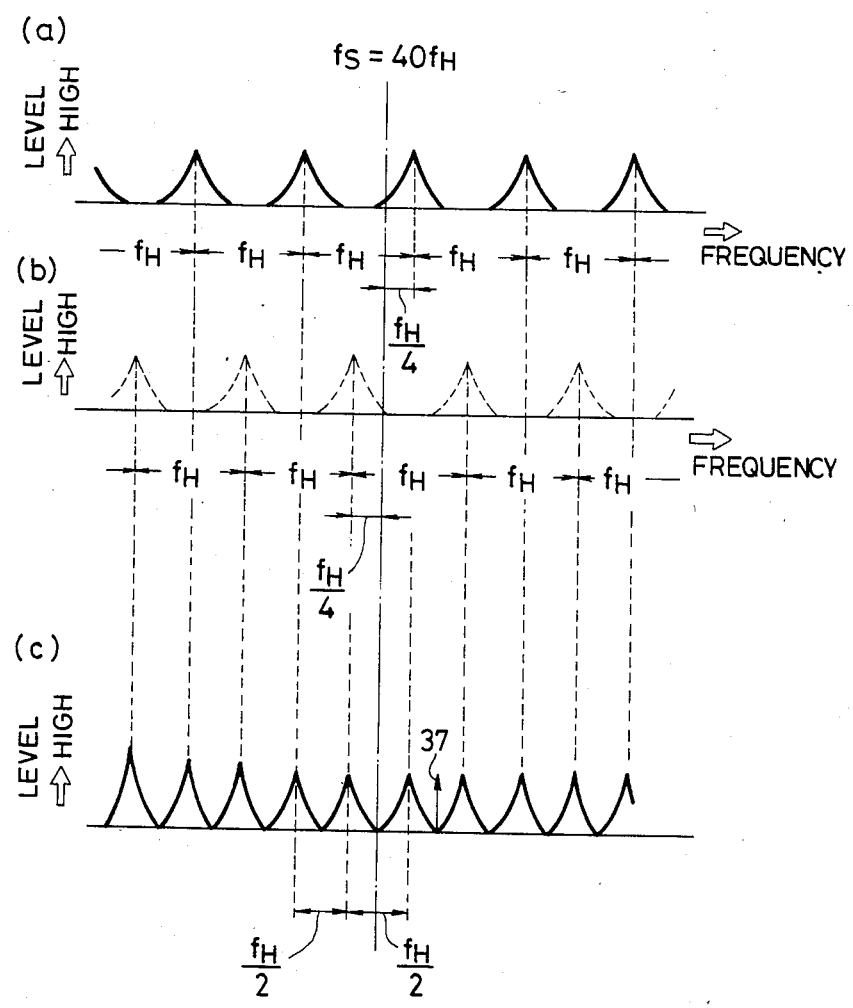
FIG. 2. consisting of (a)–(c) is a frequency spectrum diagram for explaining the operation of the present invention.

The present invention is therefore constructed so that the frequency of beats attributed to two FM sound carriers may become the frequency of the minimum energy, for example, the energy 37 in the spectrum of the down-converted chrominance signals shown in (c) of FIG. 2. More specifically, phase-locked loops (hereinbelow, abbreviated to "PLLs") are constructed in generators for the frequencies of the two FM sound carriers, to stably fix the carrier frequencies in a certain relationship (the intervals of both the carriers are integral times of $f_H/2$, and the details will be stated later) and to bring the beat frequency to the valleys of the spectrum as the energy 37, whereby degradation in the reproduced color picture quality is relieved.

Referring now to FIG. 1, sound circuits for realizing the above method will be described. A first sound signal 1 to be recorded is applied to a first frequency modulation circuit 38 in which frequency modulation is performed according to the sound signal, and the output of which is supplied to a multiplexer 39. This frequency modulation circuit 38 is constructed of a voltage controlled oscillator whose oscillation frequency is varied according to the value of a control voltage applied to the control terminal thereof. Since the first sound signal 1 is applied to the control terminal of the voltage controlled oscillator, the output of this oscillator becomes the signal subjected to the frequency modulation with the sound signal 1.

Besides, the output of the modulation circuit 38 is applied to a first frequency divider 40 and has its frequency divided by $n_1$, and the resulting signal is supplied to a first phase comparator 41. A second frequency divider 51 is supplied from the APC circuit 27 with the continuous wave signal $f_{SC}$ corresponding to the color subcarrier. Since this continuous wave signal $f_{SC}$ is fed as the reference of the corresponding PLL, it shall hereinbelow be termed the "reference signal $f_{SC}$". The frequency divider 51 divides the frequency of the input reference signal $f_{SC}$ by $n_2$. The first phase comparator 41 feeds a signal, corresponding to the phase difference between the $n_1$ frequency division signal and the $n_2$ frequency division signal, back to the voltage controlled oscillator in the frequency modulation circuit 38 through a first low-pass filter 42 and thus constructs the so-called PLL, whereby the carrier frequency $f_1$ of the frequency modulation circuit 38 is locked in the relationship of $$f_1 = \frac{n_1}{n_2} f_{SC}.$$

Likewise, a second sound signal 1' is applied to a frequency modulation circuit 43 (constructed of a voltage controlled oscillator similarly to the modulation circuit 38) in FIG. 1. The PLL is constructed of a third frequency divider 44 (frequency division by $m_1$), a fourth frequency divider 52 (frequency division by $m_2$), a second phase comparator 45 and a second low-pass filter 46, whereby the carrier frequency $f_2$ of the frequency modulation circuit 43 is locked in the relationship of $$f_2 = \frac{m_1}{m_2} f_{SC}.$$

Here, in the NTSC format, the relation of $$f_{SC} = \frac{455}{2} \times f_H$$

holds. Accordingly, the spacing between $f_1$ and $f_2$ becomes:

$$f_2 - f_1 = \frac{m_1}{m_2} \times f_{SC} - \frac{n_1}{n_2} \times f_{SC} \quad (1)$$

$$= \left( \frac{m_1}{m_2} - \frac{n_1}{n_2} \right) \times 455 \times \frac{f_H}{2}$$

and it is made integral times of $f_H/2$ by properly selecting $n_1$, $n_2$, $m_1$ and $m_2$. For example, in case of selecting $f_1$ and $f_2$ near 1.3 MHz and 1.7 MHz respectively, the spacing is made the following by setting $n_1 = 2656$, $m_1 = 3456$ and $n_2 = m_2 = 7280$:

$$f_2 - f_1 = \left( \frac{3456}{7280} - \frac{2656}{7280} \right) \times 455 \times \frac{f_H}{2}$$

$$= (216 - 166) \times \frac{f_H}{2} \quad (2)$$

$$= 50 \times \frac{f_H}{2}$$

which is integral times of $f_H/2$. In addition, the FM carrier frequencies can be stabilized at high precision as follows:

$$f_1 = \frac{n_1}{n_2} \times f_{SC} = \frac{2656}{7280} \times 3.579 \text{ (MHz)} = 1.306 \text{ (MHz)}$$

$$f_2 = \frac{m_1}{m_2} \times f_{SC} = \frac{3456}{7280} \times 3.579 \text{ (MHz)} = 1.699 \text{ (MHz)}$$

Both the FM waves are multiplexed in the multiplexer 39, the output of which is supplied to a rotary sound head 49 or 50 through a recording amplifier 47, a switcher 48 and the rotary transformer 8 and is recorded on the tape.

As the FM sound carrier frequencies $f_1$ and $f_2$ ($f_1 < f_2$), in the case of the VHS system VTR, setting these frequencies between the down-converted chrominance signal frequency $f_S = 40 f_H \div 629$ kHz and the signal of 1 to 7 MHz subjected to frequency modulation with the luminance signal is the best because the crosstalks between the respective signals can be mitigated. On this occasion, as the frequencies of unnecessary beat waves within the chrominance signal band, there are mentioned:

| second-order term | $f_2 - f_1$ |
| --- | --- |
| third-order term | $2f_1 - f_2 = f_1 - (f_2 - f_1)$ |
| fourth-order term | $2(f_2 - f_1)$ |
| fifth-order term | $3f_1 - 2f_2 = f_1 - 2(f_2 - f_1)$ |
| sixth-order term | null |
| seventh-order term | $4f_1 - 3f_2 = f_1 - 3(f_2 - f_1)$ |

Accordingly, when $n_1$, $n_2$, $m_1$ and $m_2$ are properly selected as in the foregoing, $f_1$, $f_2$ and $f_2 - f_1$ become integral times of $f_H/2$ as is known from Equations (1) and (2), and all the unnecessary beat waves become frequencies which are integral times of $f_H/2$.

Here, since the spectrum of the down-converted chrominance signal has the energy minimized every $f_H/2$ with the center at $f_S = 40 f_H$ (integral times greater than $f_H/2$) as shown in (c) of FIG. 2, all the beats become frequencies at which the energy of the down-converted chrominance signals is the minimum, and the color beats stated above become difficult to see, so that a good picture quality can be attained along with an enhanced sound quality.

Figure 3:
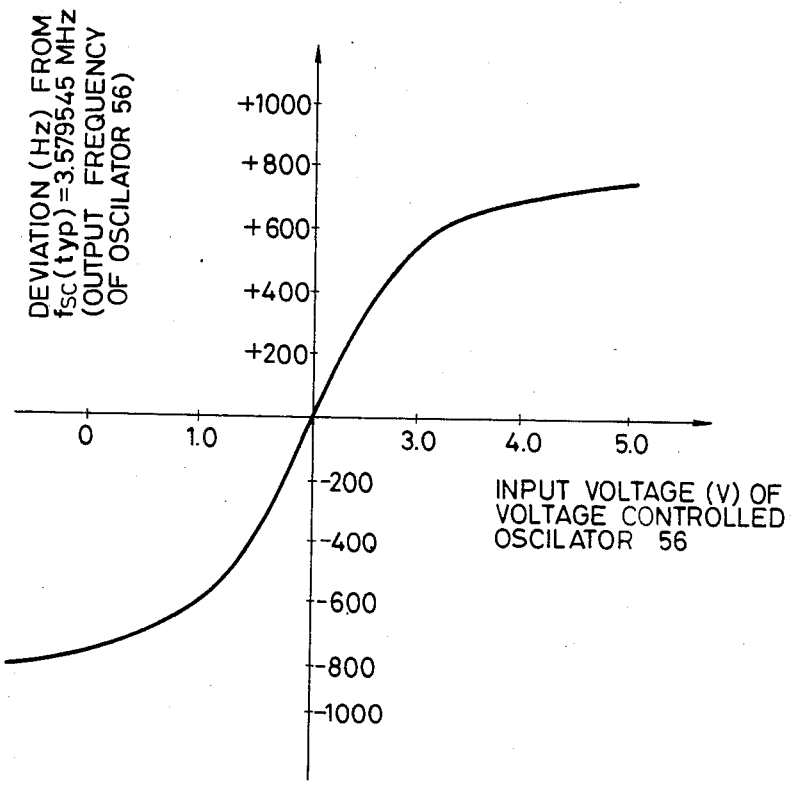
FIG. 3 is a characteristic diagram for explaining the operation of an automatic phase control circuit.

Moreover, the APC circuit 27 subjects the output of the voltage controlled oscillator employing the crystal oscillator to the PLL operation by the use of the burst signal though intermittently. Therefore, the output of the voltage controlled oscillator, namely, the frequency of the reference signal $f_{SC}$ falls within the varying width of the crystal oscillator, and its varying width is suppressed to be considerably small as shown in FIG. 3. Accordingly, even when the input video signal 6 degrades (the erroneous output of the horizontal synchronizing signal develops) due to degradation in the receiving state of a broadcast electric wave, detuning, or the like or when the horizontal synchronizing signal is disordered by the switching of the receiving channels of a tuner, the frequency of the output of the reference signal $f_{SC}$ is held fixed sufficiently stably by the APC circuit 27, and the FM sound carriers can be stabilized at high precision. That is, the present invention can eliminate the fluctuations of the FM sound carrier frequencies attributed to the disorder of the horizontal synchronizing signal which arises in case of employing a method wherein, without resorting to the present invention, the horizontal synchronizing signal 30 is applied to the second frequency divider 51 and the fourth frequency divider 52.

Figure 4:
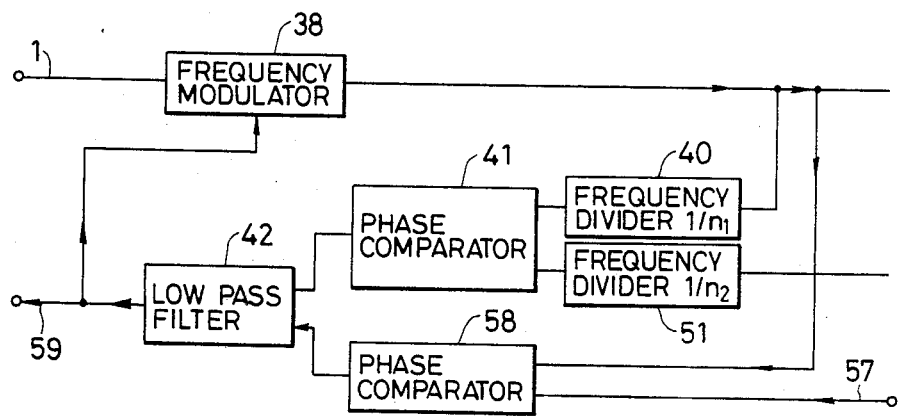
FIG. 4 is a block diagram showing another embodiment of the present invention.
Figure 5:
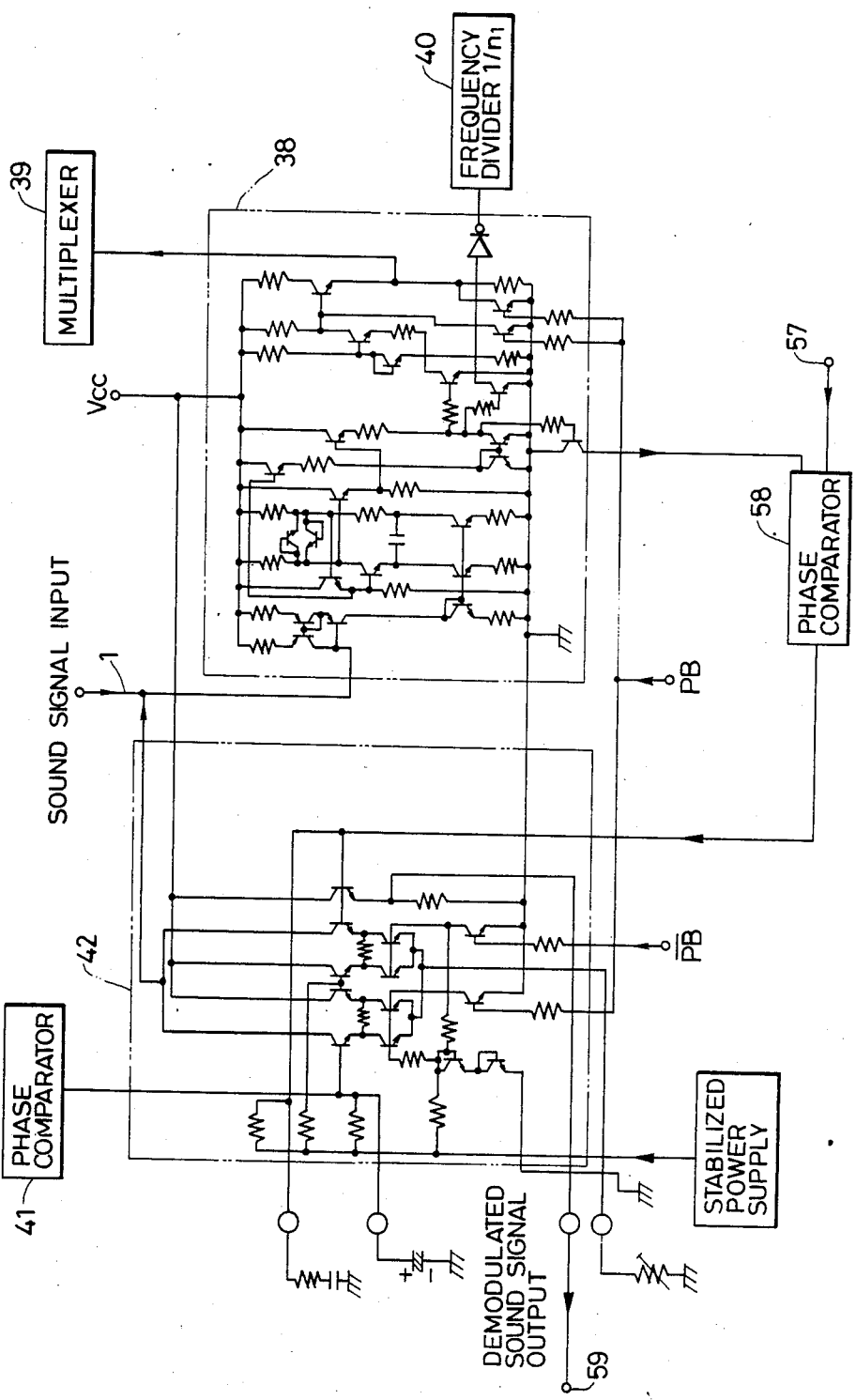
FIGS. 5 and 6 are circuit diagrams each showing a practicable embodiment of the present invention.
Figure 6:
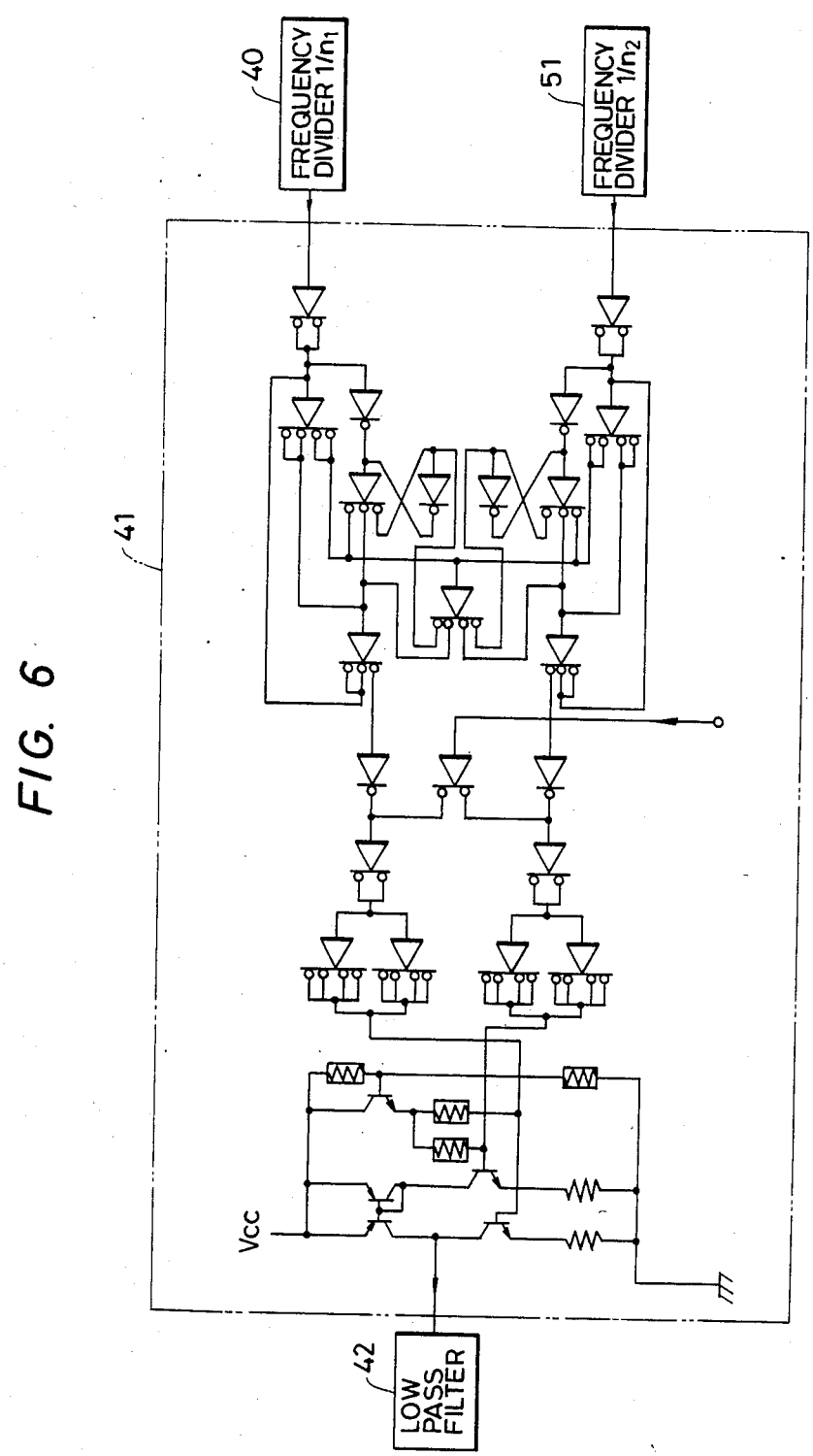

FIG. 4 shows another embodiment of essential portions. A reproduced FM signal 57 is applied to a phase comparator for reproduction 58, while the output of a modulator 38 is also applied to the reproducing phase comparator 58, to construct the so-called PLL demodulation circuit, with which a demodulated sound output 59 is obtained at the output end of a low-pass filter (hereinbelow, abbreviated to "LPF") 42. Thus, the modulator 38 is used in both the recording and reproducing modes, and a favorable demodulated sound signal can be derived without being affected by degradation in the linearity of the modulator 38. FIG. 5 shows a practicable circuit example of the modulator 38 as well as the LPF 42, and FIG. 6 a practicable circuit example of a phase comparator 41. The LPF 42 is switchedly used in the recording and reproducing modes and attains good LPF characteristics for the respective modes. In addition, the phase comparator 41 reduces the leakage of phase comparison frequencies owing to a circuit adapted to open the output of the phase comparator 41 in the state in which no phase error is originally existent.

Figure 7:
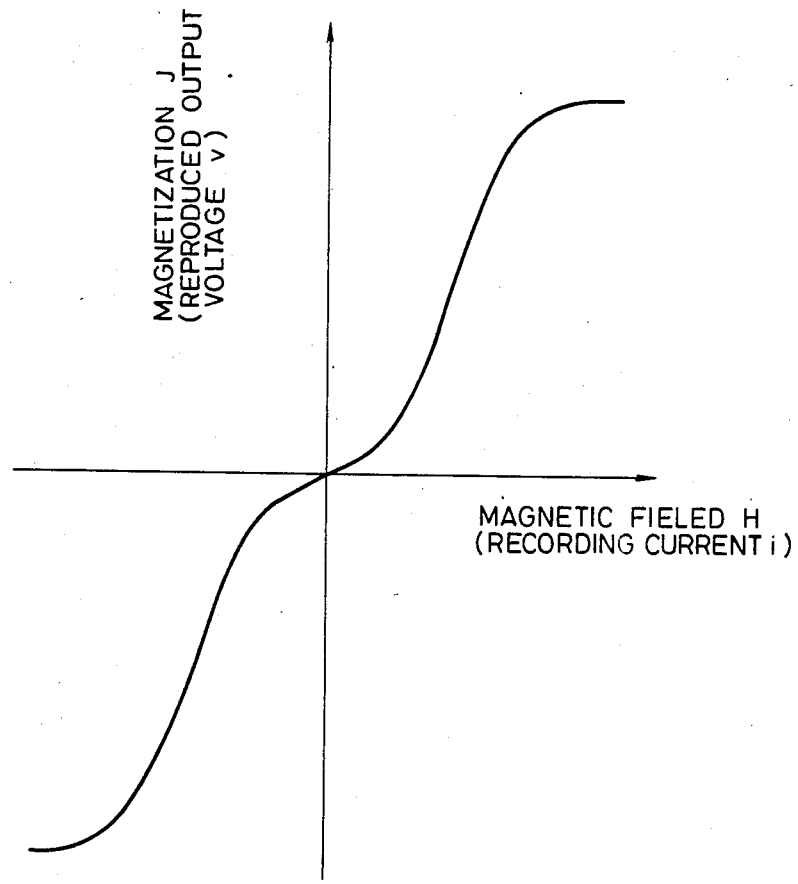
FIG. 7 is a recording and reproducing characteristic diagram of a tape/head system.

As stated in the prior-art example, the recording system using a video track for the double purpose and based on the frequency multiplexing is comparatively less susceptible to the non-linearity of the tape/head system and enjoys the effect of the present invention less because the signal (carrier: 4 MHz) subjected to frequency modulation with the luminance signal is greater (15–25 dB) in the recording level than the signal subjected to frequency modulation with the sound signal and has the bias effect on the latter signal. In contrast, with the superposed writing system, the modulated sound signal recorded on the tape is once erased by the modulated luminance signal, and hence, the recording level of the modulated sound signal is greater than in the case of the frequency multiplexing system. Therefore, the recording and reproducing characteristics of the tape/head system are an odd function as shown in FIG. 7, and distortions of odd-numbered orders are liable to occur. Accordingly, the effect of the present invention is great particularly in the case of the superposed writing system.

As described above, the present invention produces the effect that good reproduced sounds are obtained by setting two FM sound carriers, while the impediment to the quality of a reproduced picture can be relieved.

We claim:

1. A magnetic recording and reproducing apparatus wherein a first sound carrier subjected to frequency modulation with a first sound signal and a second sound carrier subjected to frequency modulation with a second sound signal are recorded on a track for recording a video signal, said apparatus comprising:
  an automatic phase control circuit which generates a reference signal equal in frequency to a color subcarrier of a chrominance signal to be recorded and synchronized with the color subcarrier; and
  first and second phase-locked loops which generate the first and second sound carriers respectively and each of which is composed of:
    a frequency modulator constructed of a voltage controlled oscillator;
    a first frequency divider for dividing
    a frequency of an output from said frequency modulator;
    a second frequency divider supplied with the reference signal generated by said automatic phase control circuit and for dividing a frequency of said reference signal;
    a phase comparator supplied with outputs from both said frequency dividers and for comparing phases of both the outputs; and
    a low-pass filter supplied with an output from said phase comparator and for supplying its output to said voltage controlled oscillator of said frequency modulator.

2. A magnetic recording and reproducing apparatus according to claim 1, wherein frequency division numbers of said frequency dividers are so selected that a difference $f_2 - f_1$ between respective frequencies $f_1$ and $f_2$ of the first and second sound carriers becomes integral times of $\frac{1}{2}$ of a frequency $f_H$ of a horizontal synchronizing signal.

3. A magnetic recording and reproducing apparatus according to claim 1, wherein when a frequency $f_{SC}$ of the reference signal and a horizontal synchronizing signal frequency $f_H$ of the video signal to be recorded are in a relationship of:

$$f_{SC} = \frac{455}{2} \times f_H$$

respective frequency division numbers $n_1$ and $n_2$ of said first and second frequency dividers of said first phase-locked loop and respective frequency division numbers $m_1$ and $m_2$ of said first and second frequency dividers of said second phase-locked loop are so selected that $$\frac{n_1}{n_2} \times 455 \text{ and } \frac{m_1}{m_2} \times 455$$

become integers.

4. A magnetic recording and reproducing apparatus according to claim 1, wherein when a frequency $f_{SC}$ of the reference signal and a horizontal synchronizing signal frequency $f_H$ of the video signal to be recorded are in a relationship of:

$$f_{SC} = \frac{455}{2} \times f_H$$

$n_1$ and $n_2$ which are respective frequency division numbers of said first and second frequency dividers in said first phase-locked loop, and $m_1$ and $m_2$ which are respective frequency division numbers of said first and second frequency dividers in said second phase-locked loop are selected as follows:
$n_1 = 2656$,
$m_1 = 3456$, and
$n_2 = m_2 = 7280$.

* * * * *